United States Patent
Nishizawa et al.

(10) Patent No.: US 11,232,164 B2
(45) Date of Patent: Jan. 25, 2022

(54) INFORMATION PROVIDING METHOD, PROGRAM, AND DEVICE

(71) Applicant: Gurunavi, Inc., Chiyoda-ku (JP)

(72) Inventors: Kiyoshi Nishizawa, Chiyoda-ku (JP); Ryo Suzuki, Chiyoda-ku (JP); Yoko Kawatsu, Chiyoda-ku (JP)

(73) Assignee: Gurunavi, Inc., Chiyoda-ku (JP)

( * ) Notice: Subject to any disclaimer, the term of this patent is extended or adjusted under 35 U.S.C. 154(b) by 171 days.

(21) Appl. No.: 16/303,521

(22) PCT Filed: May 31, 2017

(86) PCT No.: PCT/JP2017/020277
§ 371 (c)(1),
(2) Date: Nov. 20, 2018

(87) PCT Pub. No.: WO2018/008302
PCT Pub. Date: Jan. 11, 2018

(65) Prior Publication Data
US 2020/0279009 A1    Sep. 3, 2020

(30) Foreign Application Priority Data

Jul. 3, 2016 (JP) .............................. JP2016-132119

(51) Int. Cl.
*G06F 16/9538* (2019.01)
*G06F 16/9532* (2019.01)
(Continued)

(52) U.S. Cl.
CPC ........ *G06F 16/9538* (2019.01); *G06F 3/0482* (2013.01); *G06F 16/9532* (2019.01); *G06F 16/9577* (2019.01)

(58) Field of Classification Search
CPC ............ G06F 16/9538; G06F 16/9532; G06F 16/9577; G06F 3/0482
See application file for complete search history.

(56) References Cited

U.S. PATENT DOCUMENTS 7,831,581 B1* 11/2010 Emigh .................. G06F 16/986
707/706
2003/0018789 A1* 1/2003 Ishiguro .................. H04L 63/08
709/228

(Continued)

FOREIGN PATENT DOCUMENTS

JP      2000-29883 A    1/2000
JP      2004-341965 A   12/2004
(Continued)

OTHER PUBLICATIONS

International Search Report dated Jul. 11, 2017 in PCT/JP2017/020277 filed May 31, 2017.
(Continued)

Primary Examiner — Ken Hoang
(74) Attorney, Agent, or Firm — Oblon, McClelland, Maier & Neustadt, L.L.P.

(57) ABSTRACT

An information providing method includes determining whether a request for displaying a retrieval result page has been made in a specific website including the retrieval result page on which a retrieval target extracted under retrieval conditions including one or a plurality of retrieval items, among a plurality of retrieval targets registered in advance, is displayed. Displayed contents are changed in accordance with whether or not the display request has been made in the specific website.

20 Claims, 9 Drawing Sheets

(51) Int. Cl.
*G06F 16/957* (2019.01)
*G06F 3/0482* (2013.01)

(56) References Cited

U.S. PATENT DOCUMENTS

| | | | | |
|---|---|---|---|---|
| 2010/0205541 A1* | 8/2010 | Rapaport | ............... | G06Q 30/02 |
| | | | | 715/753 |
| 2010/0257197 A1* | 10/2010 | Hirayama | ........... | G06F 16/9535 |
| | | | | 707/769 |
| 2013/0282683 A1* | 10/2013 | Kohavi | ................ | G06F 16/954 |
| | | | | 707/706 |
| 2015/0324433 A1* | 11/2015 | Duffy | .................... | G06F 16/248 |
| | | | | 707/722 |
| 2016/0260182 A1* | 9/2016 | Garman | ................. | G06Q 10/02 |
| 2016/0299973 A1* | 10/2016 | Oakeson | ............. | G06F 16/9535 |
| 2017/0024424 A1* | 1/2017 | Almohizea | ........... | G06F 16/248 |
| 2017/0199916 A1* | 7/2017 | Loomans | ........... | G06F 16/248 |

FOREIGN PATENT DOCUMENTS

| | | |
|---|---|---|
| JP | 2006-40179 A | 2/2006 |
| JP | 2009-251641 A | 10/2009 |
| JP | 2010-231525 A | 10/2010 |
| JP | 2011-43973 A | 3/2011 |
| JP | 2012-3381 A | 1/2012 |
| JP | 2014-157571 A | 8/2014 |
| JP | 2016-62275 A | 4/2016 |
| WO | WO 2015/151199 A1 | 10/2015 |

OTHER PUBLICATIONS

Written Opinion dated Jul. 11, 2017 in PCT/JP/020277 filed May 31, 2017 (with English translation).

Notice of Reasons for Rejection dated Aug. 21, 2018 in corresponding Japanese Application No. 2018-525975, (with English translation).

Office Action dated Nov. 5, 2019 in corresponding Japanese Patent Application No. 2018-195881 (with English Translation), 13 pages.

Office Action dated Apr. 28, 2020 in corresponding Japanese Patent Application No. 2018-195882 (with English Translation), 10 pages.

* cited by examiner

| USER ID | USER NAME | PASSWORD | CONTACT ADDRESS | USE THEME | | |
|---|---|---|---|---|---|---|
| 0001 | USER A1 | g536h3w5 | user1@mail.com | WOMEN MEETING | DATE | ... |
| 0002 | USER A2 | 7j3567wyh | user2@mail.com | HIDEOUT | WOMEN MEETING | ... |
| 0003 | USER A3 | 46ju3w5u | user3@mail.com | BANQUET | BEER GARDEN | ... |
| ... | ... | ... | ... | ... | ... | ... |

| FACILITY ID | FACILITY NAME | AREA | GENRE OF DISHES | BUDGET | THEME | | |
|---|---|---|---|---|---|---|---|
| 0001 | RESTAURANT B1 | GINZA | ITALIAN AND FRENCH | 8000 YEN | DATE | WOMEN MEETING | ... |
| 0002 | RESTAURANT B2 | GINZA | SUSHI AND FISH DISHES | 5000 YEN | WOMEN MEETING | HIDEOUT | ... |
| 0003 | RESTAURANT B3 | GINZA | ITALIAN | 3000 YEN | BEER GARDEN | BANQUET | ... |
| ... | ... | ... | ... | ... | ... | ... | ... |

| TIME | THEME |
|---|---|
| JANUARY | NEW YEAR'S PARTY |
| FEBRUARY | POT |
| MARCH | CHERRY-BLOSSOM VIEWING |
| ... | ... |
| JULY | BEER GARDEN |
| ... | ... |
| DECEMBER | YEAR-END PARTY |

| AREA | SPOT | | |
|---|---|---|---|
| GINZA | ○○ CITY | ... | ... |
| SHINBASHI | ○○ YOKOMACHI | ... | ... |
| ROPPONGI | △△ PLAZA | ... | ... |
| ... | ... | ... | ... |
| SHINAGAWA | □□ GARDEN | ... | ... |
| ... | ... | ... | ... |

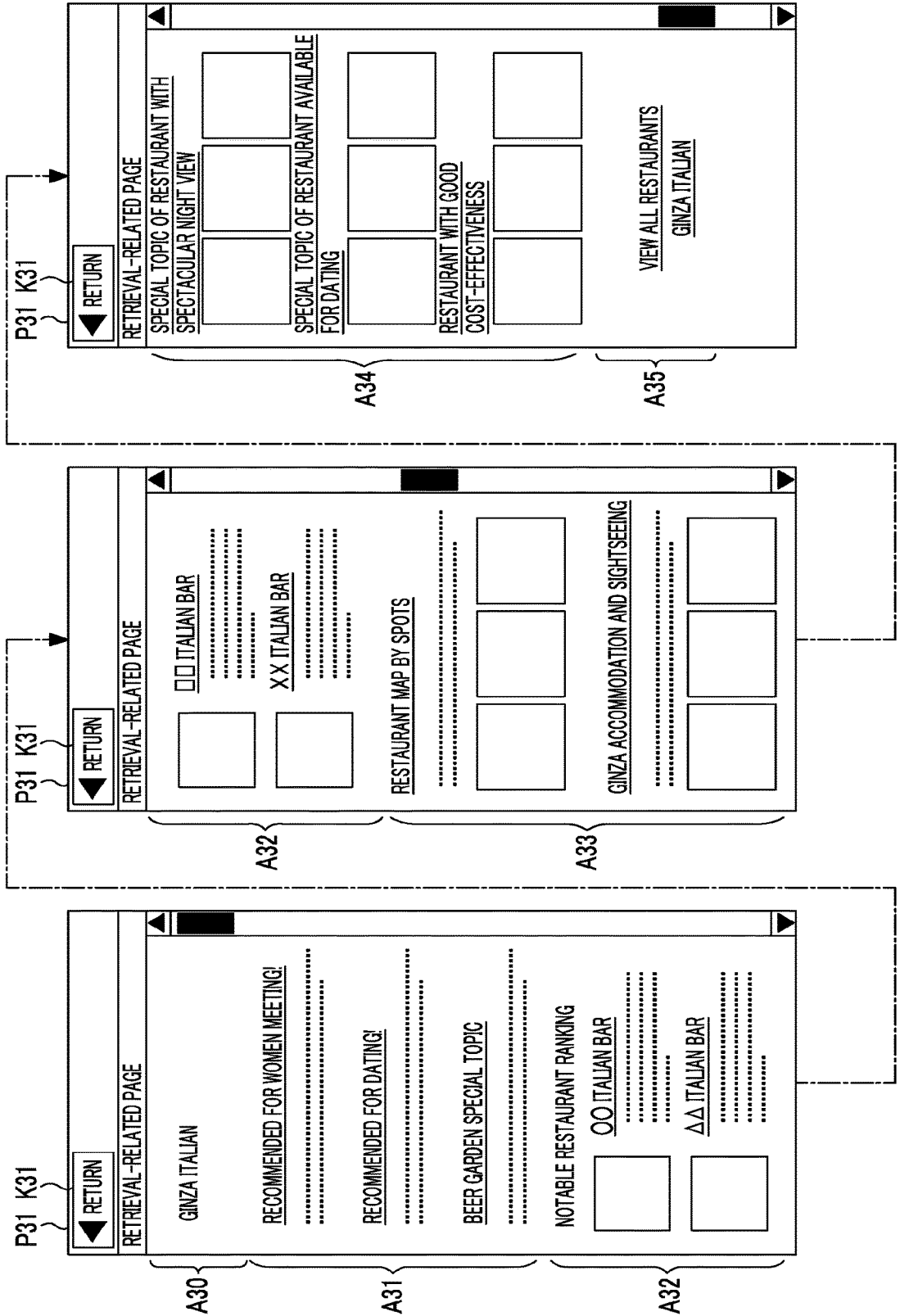

INFORMATION PROVIDING METHOD, PROGRAM, AND DEVICE

BACKGROUND OF THE INVENTION

1. Field of the Invention

The present invention relates to an information providing method, an information providing program, and an information providing device which provide various pieces of information in accordance with a user's operation.

2. Description of Related Art

In general, there has been known a technique for providing information on a facility which is extracted in accordance with retrieval conditions, such as an area and a genre, from a plurality of facilities registered in advance in a case where the retrieval conditions are input on a specific web page, such as a gourmet information retrieval site, with a specific facility such as a restaurant as a retrieval target (see, for example, PTL 1).

Incidentally, also in a case where retrieval conditions, such as an area and a genre, of a retrieval target are input in an external retrieval site, such as a so-called retrieval engine, instead of a specific web page with a specific facility as a retrieval target, link information for displaying retrieval results on the specific web page may be displayed as the retrieval results. In this case, a user can view the retrieval results on the specific web page by accessing the link information.

CITATION LIST

Patent Literature

PTL 1: Japanese Unexamined Patent Application Publication No. 2014-157571

SUMMARY OF THE INVENTION

However, when the retrieval results are not information which is sufficiently useful to the user even in a case where the retrieval results are displayed by transition from the link information to the specific web page, a problem also occurs that the rate (so-called direct return rate) of the user's leaving from the specific web page without transitioning to another page, such as an introduction page of each store, after the user's visit to the specific web page is increased.

An object of the invention is to provide an information providing method, an information providing program, and an information providing device which are capable of providing useful information with respect to a user's retrieval operation.

In an information providing method according to the invention, it is determined whether a request for displaying a retrieval result page has been made in a specific website including the retrieval result page in a case where the display request has been made, in which the retrieval result page is a page on which a retrieval target extracted under retrieval conditions including one or a plurality of retrieval items, among a plurality of retrieval targets registered in advance, is displayed. Displayed contents are changed in accordance with whether or not the display request has been made in the specific website.

An information providing program according to the invention is an information providing program for causing a processor to execute a step of determining whether a request for displaying a retrieval result page has been made in a specific website including the retrieval result page, in a case where the display request has been made, the retrieval result page being a page on which a retrieval target extracted under retrieval conditions including one or a plurality of retrieval items, among a plurality of retrieval targets registered in advance, is displayed, and a step of changing displayed contents in accordance with whether or not the display request has been made in the specific website.

An information providing device according to the invention includes a determination processing unit that determines whether a request for displaying a retrieval result page has been made in a specific website including the retrieval result page, in a case where the display request has been made, the retrieval result page being a page on which a retrieval target extracted under retrieval conditions including one or a plurality of retrieval items, among a plurality of retrieval targets registered in advance, is displayed, and a display processing unit that changes displayed contents in accordance with whether or not the display request has been made in the specific website.

According to the invention, an information providing method, an information providing program, and an information providing device which are capable of providing useful information with respect to a user's retrieval operation are provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2A is a diagram illustrating an example of user information which is used in the information providing system according to the embodiment of the invention;

FIG. 2B is a diagram illustrating an example of facility information which is used in the information providing system according to the embodiment of the invention;

FIG. 2C is a diagram illustrating an example of time information which is used in the information providing system according to the embodiment of the invention;

FIG. 2D is a diagram illustrating an example of area information which is used in the information providing system according to the embodiment of the invention;

FIG. 8 is a diagram illustrating an example of a display screen which is displayed on the user terminal in the information providing system according to the embodiment of the invention.

DETAILED DESCRIPTION OF EMBODIMENTS

Hereinafter, an embodiment of the invention will be described with reference to the accompanying drawings, and is provided for the understanding of the invention. Meanwhile, the following embodiment is an embodied example of the invention, and does not limit the technical scope of the invention.

[Information Providing System 1]

Figure 1:
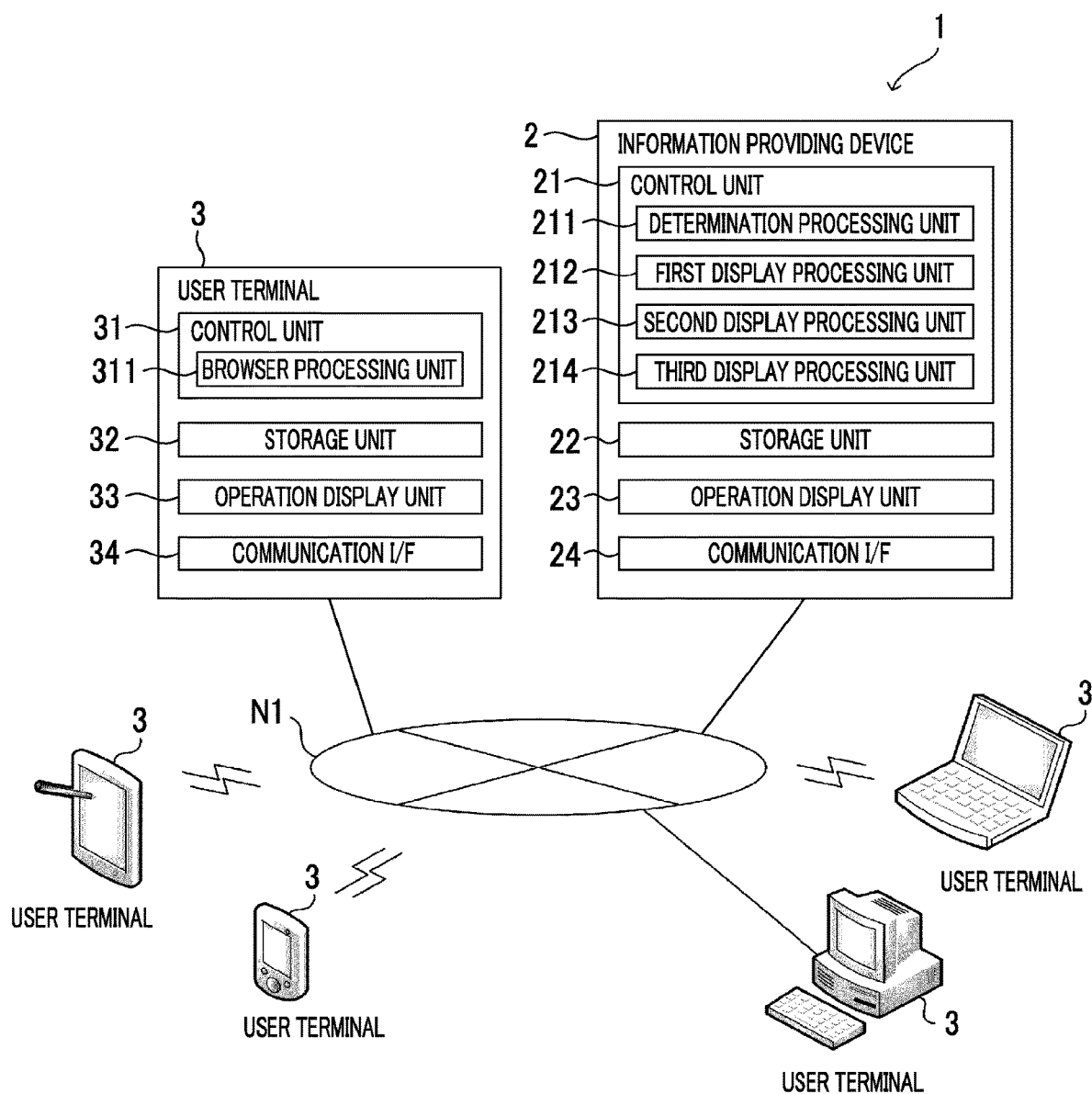
FIG. 1 is a block diagram illustrating a configuration of an information providing system according to an embodiment of the invention.

As illustrated in FIG. 1, an information providing system 1 according to the embodiment of the invention includes an information providing device 2 and one or a plurality of user terminals 3. The information providing device 2 and the user terminal 3 can communicate with each other through a communication network N1 such as the Internet, a LAN, a WAN, or a public telephone line.

In the information providing system 1, the information providing device 2 extracts one or a plurality of retrieval targets from a plurality of retrieval targets having been registered in advance, in accordance with retrieval conditions which are set in accordance with a user's operation with respect to the user terminal 3, and provides information on each of the retrieval targets to the user terminal 3 to display the information. The retrieval target according to this embodiment is a facility, such as a restaurant, an event hall, a hotel, or a golf course, which is used in various events such as a new year's party, a year-end party, a barbecue, a banquet, a social gathering, a graduates' association, a company trip, and a golf competition. In addition, the retrieval target may be an article such as food, an electric appliance, or a vehicle. In this embodiment, a description will be given of a case where the retrieval target is a facility such as a restaurant.

[Information Providing Device 2] As illustrated in FIG. 1, the information providing device 2 is a server that includes a control unit 21, a storage unit 22, an operation display unit 23, a communication I/F 24, and the like. Meanwhile, the information providing device 2 is not limited to one computer, and may be a computer system in which a plurality of computers are operated in cooperation with each other. In addition, various processes executed by the information providing device 2 may be dispersedly executed by one or a plurality of processors.

The communication I/F 24 is a communication interface that connects the information providing device 2 to a communication network N1 in a wired or wireless manner and is used to execute data communication based on a predetermined communication protocol with an external apparatus, such as the user terminal 3, through the communication network N1.

The operation display unit 23 is a user interface that includes a display unit such as a liquid crystal display or an organic EL display that displays various pieces of information, and an operation unit, such as a mouse, a keyboard, or a touch panel, which receives an operation.

The storage unit 22 is a non-volatile storage unit, such as a Hard Disk Drive (HDD) or a Solid State Drive (SSD), which stores various pieces of information. Specifically, the storage unit 22 stores data such as user information D1, facility information D2, time information D3, and area information D4. Here, FIG. 2A is a diagram illustrating an example of the user information D1, and FIG. 2B is a diagram illustrating an example of the facility information D2. In addition, FIG. 2C is a diagram illustrating an example of the time information D3, and FIG. 2D is a diagram illustrating an example of the area information D4.

As illustrated in FIG. 2A, the user information D1 includes information, such as a user ID, a user name, a password, a contact address, and a use theme, which corresponds to each user of the user terminal 3. The user ID is identification information for identifying a user, and the user ID and the password are used in the user's login processing. The user name is the name of the user, or the like. The contact address is information serving as an address when the user is notified of information, and is, for example, an e-mail address or an ID of Social Networking Service (SNS). In addition, the use theme includes one or a plurality of themes corresponding to a facility which was used in the past by the user.

As illustrated in FIG. 2B, the facility information D2 includes information, such as a facility ID, a facility name, an area, a genre, a budget, and a theme, which corresponds to each facility. The area indicates the location of the facility, and the genre is service contents provided by the facility and indicates, for example, the genre of dishes. The budget is, for example, the amount of money which has been set in advance as an average amount of money which is necessary for the use of the facility. The theme is information which has been set in advance as information indicating features of the facility, and the like, and includes each theme such as "dating", "women meeting", "beer garden", "hideout", or "banquet". Meanwhile, the facility information D2 may also include information such as the purpose of use, the number of persons allowed, whether or not a coupon is usable, whether or not an all-you-can-drink service is present, and whether or not an all-you-can-eat service is present.

As illustrated in FIG. 2C, in the time information D3, for example, a theme corresponding each of January to December is stored in advance. As illustrated in FIG. 2D, in the area information D4, a spot corresponding to each area such as Ginza or Shinbashi is stored in advance. The time information D3 and the area information D4 are referred to by the control unit 21 during the display of a retrieval-related page P31 to be described later (see FIG. 8).

Meanwhile, as another embodiment, it is also considered that some or all of the pieces of information such as the user information D1, the facility information D2, the time information D3, and the area information D4 are stored in another service to be accessible by the information providing device 2 through the communication network N1. The control unit 21 of the information providing device 2 may acquire various pieces of information from the server to execute each process such as an information providing process to be described later (see FIG. 3).

In addition, the storage unit 22 also stores information on a specific website for causing the user terminal 3 to display various web pages for which a display layout has been set in advance. Specifically, the specific website displayed on the user terminal 3 includes a retrieval page P11 (see FIG. 4), a retrieval result page P12 (see FIG. 5), a related information page (not shown), a retrieval-related page P31 (see FIG. 8) which are to be described later, and the like. Meanwhile, in the specific website, one or a plurality of retrieval targets are extracted from retrieval targets such as a plurality of facilities or articles which have been registered in advance, in accordance with retrieval conditions. In this embodiment, a description will be given of an example of a case where the specific website is a gourmet information retrieval site which is used for the retrieval of a facility such as a restaurant. Meanwhile, the specific website may be a set of web pages belonging to one domain which has been set in advance. However, for example, a set of web pages belonging to a plurality of domains stored in the same information providing device 2 may be treated as the specific website. In addition, the web pages included in the specific website may be dispersedly stored in servers such as the plurality of information providing devices 2.

Figure 3:
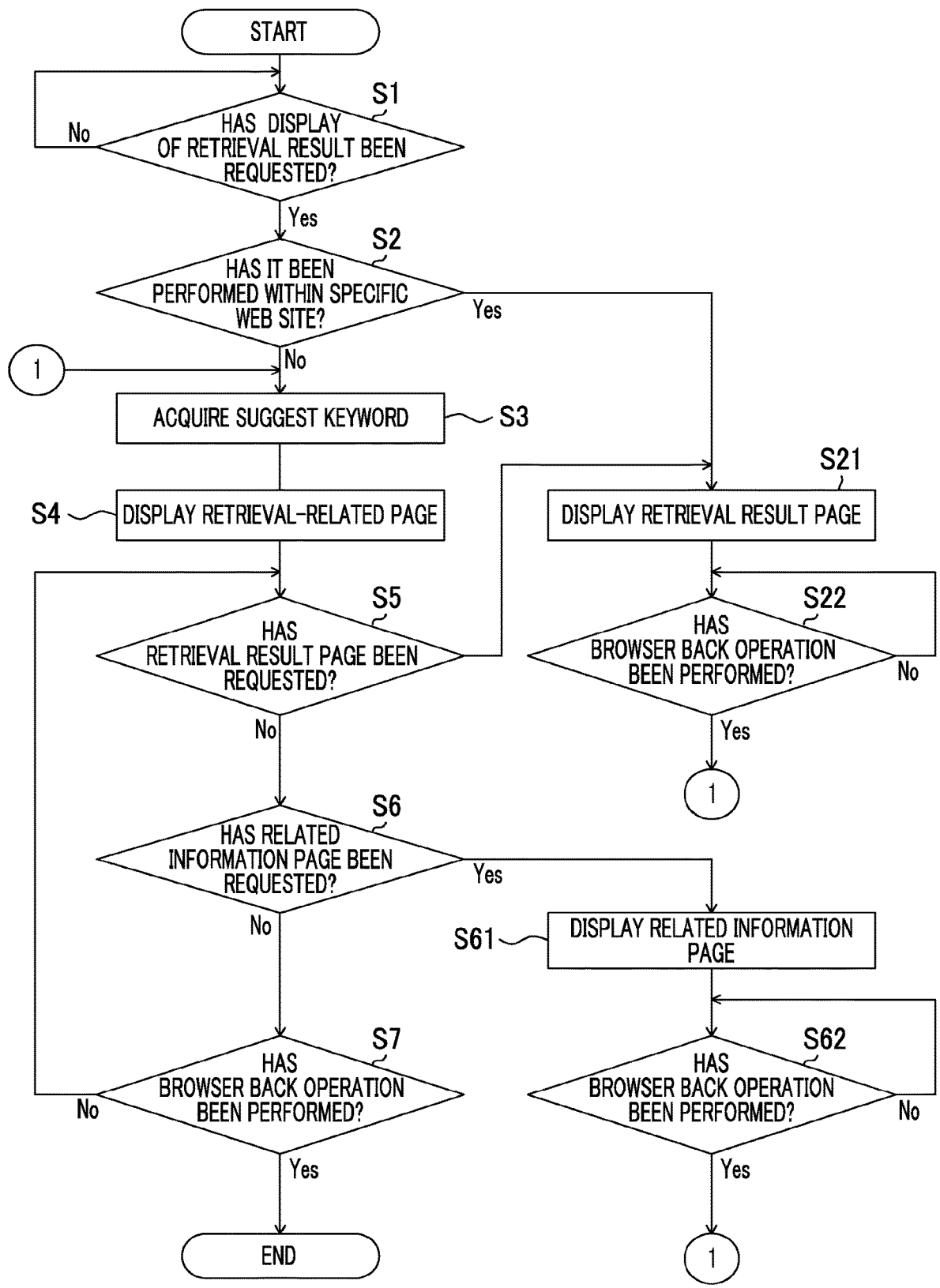
FIG. 3 is a flowchart illustrating an example of an information providing process which is executed by an information providing device according to the embodiment of the invention.

Further, the storage unit 22 stores a control program such as an information providing program for causing the control unit 21 to execute an information providing process to be described later (see FIG. 3). For example, the information providing program is stored in a computer-readable recording medium, such as a CD or a DVD, in a non-transitory manner, and is read by a reading device (not shown), such as a CD drive or a DVD drive, which is included in the information providing device 2 and is stored in the storage unit 22.

The control unit 21 includes a control apparatus such as a CPU, a ROM, and a RAM. The CPU is a processor that executes various computational processes. The ROM is a non-volatile storage unit in which control programs, such as BIOS and OS, for causing the CPU to execute various computational processes are stored in advance. The RAM is a volatile or non-volatile storage unit that stores various pieces of information, and is used as a transitory storage memory (work area) for various processes which are executed by the CPU. The control unit 21 controls the information providing device 2 by causing the CPU to execute various control programs stored in the ROM or the storage unit 22 in advance.

Specifically, the control unit 21 includes various processing units such as a determination processing unit 211, a first display processing unit 212, a second display processing unit 213, and a third display processing unit 214, as illustrated in FIG. 1. Meanwhile, the control unit 21 functions as the various processing units by causing the CPU to execute various processes based on the information providing program. In addition, some or all of the processing units included in the control unit 21 may be constituted by an electronic circuit. Meanwhile, the information providing program may be a program for causing a plurality of processors to function as the various processing units.

The determination processing unit 211 determines whether or not a request for displaying a retrieval result page has been made on a specific website including the retrieval result page, in a case where the display request has been made, the retrieval result page being a page on which a facility extracted under retrieval conditions including one or a plurality of retrieval items among a plurality of facilities having been registered in advance is displayed. Specifically, the determination processing unit 211 can determine whether or not the display request has been made on the specific website, on the basis of reference information when the request for displaying the retrieval result page is made. The reference information is information indicating an address which is a transition source to the specific website being currently displayed, and is transmitted to the information providing device 2 from the user terminal 3 at the time of accessing the specific website.

The first display processing unit 212 displays the retrieval result page on the user terminal 3 in a case where the request for displaying the retrieval result page is made on the specific website. That is, the first display processing unit 212 displays the retrieval result page without displaying a retrieval-related page to be described later, in a case where the display request is made on the specific website.

The second display processing unit 213 displays a retrieval-related page on the user terminal 3 instead of displaying the retrieval result page, in a case where the request for displaying the retrieval result page is made on an external website different from the specific website. The external website is a retrieval site such as a so-called retrieval engine, rather than a specific web page with a specific facility, an article, or the like, which has been registered in advance, as a retrieval target. A first operation portion and a second operation portion are displayed on the retrieval-related page. The first operation portion receives a request for displaying the retrieval result page, and the second operation portion receives a request for displaying a related information page on which related information extracted in association with one or a plurality of retrieval items is displayed. That is, in a case where the display request is made from the external website, the retrieval-related page is displayed before the retrieval result page is displayed. Meanwhile, the first display processing unit 212 and the second display processing unit 213 are examples of a display processing unit according to the invention.

Meanwhile, the related information page is a page within the specific website, and is a page that has a domain in common with the specific website. In addition, the specific website and the related information page are not limited to one domain, and may belong to a set of plurality of domains which are set in advance. For example, it is considered that the specific website and the related information page are web pages belonging to any one of the plurality of domains which are stored in the same information providing device 2. Meanwhile, the related information pages included in the specific website may be dispersedly stored in servers such as the plurality of information providing devices 2.

The third display processing unit 214 displays the retrieval result page in a case where the first operation portion displayed on the retrieval-related page is operated, and displays the related information page in a case where the second operation portion is operated. That is, the user performs the operation of the display request in the external website and the operation of the first operation portion for making a request for displaying the retrieval result page in the retrieval-related page, in order to view the retrieval result page from the external website.

[User Terminal 3]

As illustrated in FIG. 1, the user terminal 3 includes a control unit 31, a storage unit 32, an operation display unit 33, a communication I/F 34, and the like. The user terminal 3 is an information processing device such as a cellular phone, a smart phone, a tablet terminal, or a personal computer, and is used by a user who accesses the information providing device 2 to retrieve a facility.

Specifically, the user logs on the information providing device 2 by inputting a user ID and a password to the user terminal 3 in a predetermined login page. Thereby, the control unit 21 of the information providing device 2 can identify the user who currently logs on the user terminal 3.

The communication I/F 34 is a communication interface that connects the user terminal 3 to the communication network N1 in a wired or wireless manner and is used to execute data communication based on a predetermined communication protocol with an external apparatus, such as the information providing device 2, through the communication network N1.

The operation display unit 33 is a user interface that includes a display unit such as a liquid crystal display or an organic EL display that displays information such as various web pages, and an operation unit, such as a mouse, a keyboard.

The storage unit 32 is a non-volatile storage unit, such as a flash memory, which stores various pieces of information. For example, the storage unit 32 stores a control program such as a browser program. Specifically, the browser program is a control program for causing the control unit 31 to execute a communication process with an external device such as the information providing device 2 in accordance with a communication protocol such as a Hypertext Transfer Protocol (HTTP).

The control unit 31 includes a control apparatus such as a CPU, a ROM, and a RAM. The CPU is a processor that executes various computational processes. The ROM is a non-volatile storage unit in which control programs, such as BIOS and OS, for causing the CPU to execute various computational processes are stored in advance. The RAM is a volatile or non-volatile storage unit that stores various pieces of information, and is used as a transitory storage memory (work area) for various processes which are executed by the CPU. The control unit 31 controls the user terminal 3 by causing the CPU to execute various control programs stored in the ROM or the storage unit 32 in advance.

Specifically, the control unit 31 functions as a browser processing unit 311 by executing various processes in accordance with the browser program stored in the storage unit 32. The browser processing unit 311 can display a web page, which is provided from the information providing device 2 through the communication network N1, on the operation display unit 33, and can execute browser processing for inputting an operation with respect to the operation display unit 33 to the information providing device 2. Meanwhile, some or all of the processing units included in the control unit 31 may be constituted by an electronic circuit.

Incidentally, also in a case where retrieval conditions, such as an area and a genre, of a retrieval target are input in another retrieval site, such as a so-called retrieval engine, instead of the specific web page, link information for displaying retrieval results on the specific web page may be displayed as the retrieval results. However, when the retrieval results are not information which is sufficiently useful to the user even in a case where the retrieval results are displayed by the transition of the link information to the specific web page, a problem also occurs that the rate (so-called direct return rate) of the user's leaving from the specific web page without transitioning to another page, such as an introduction page of each store, after the user's visit to the specific web page is increased. On the other hand, in the information providing system 1 according to this embodiment, it is possible to provide useful information with respect to the user's retrieval operation.

[Information Providing Process]

Hereinafter, an information providing process executed by the control unit 21 of the information providing device 2 will be described with reference to FIG. 3. Meanwhile, the control unit 21 individually executes the information providing process corresponding to each user terminal 3 in a case where access is made from the user terminal 3. That is, the control unit 21 can execute the information providing processes corresponding to a plurality of user terminals 3 by time-division substantially in parallel. In addition, the information providing process may be terminated halfway by a predetermined operation with respect to the user terminal 3.

In addition, the invention can be regarded as the invention of an information providing method for executing one or a plurality of steps included in the information providing process, and one or a plurality of steps included in the information providing process described here may be appropriately omitted. Meanwhile, the order of execution of the steps in the information providing process may vary within a range in which the same operational effects are generated. Further, here, a description is given of an example of a case where the steps in the information providing process are executed by the control unit 21, but an information providing method for dispersedly executing the steps in the information providing process by a plurality of processors is also considered as another embodiment.

<Step S1>

In step S1, the control unit 21 determines whether or not a retrieval result display request for displaying a retrieval result page in the specific website has been made. When it is determined that the retrieval result display request has been made (S1: Yes), the process proceeds to step S2. When the retrieval result display request has not been made (S1: No), the process stands by in step S1.

Specifically, the control unit 21 determines that the retrieval result display request has been made in a case where the input of retrieval conditions for displaying the retrieval result page within the specific website and a retrieval start operation have been performed by the user terminal 3 (S1: Yes). Here, FIGS. 4 and 5 are diagrams illustrating a retrieval operation which is performed within the specific website.

Figure 4:
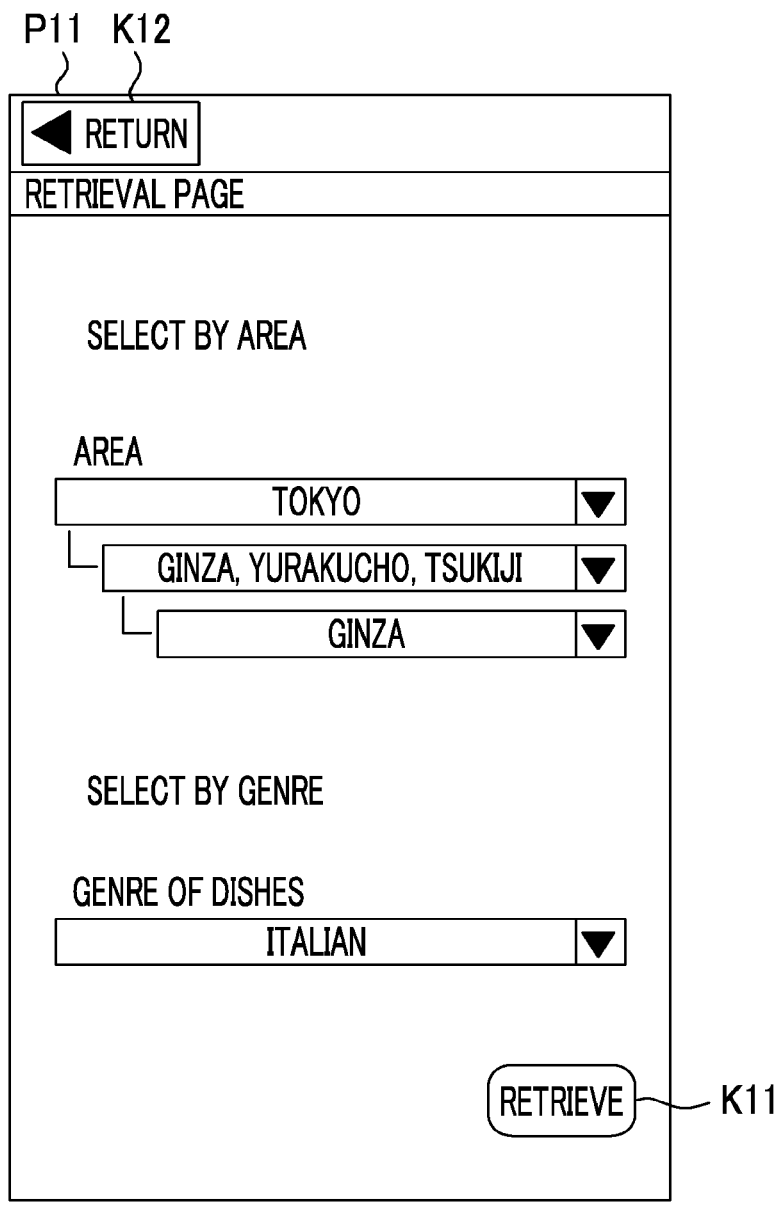
FIG. 4 is a diagram illustrating an example of a display screen which is displayed on a user terminal in the information providing system according to the embodiment of the invention.

As illustrated in FIG. 4, the control unit 21 displays a retrieval page P11 on the user terminal 3 when access is made from the user terminal 3 to the specific website. In addition, the control unit 21 receives an operation of setting retrieval conditions including an area, a genre, and the like as retrieval items from the user terminal 3.

When a retrieval key K11 displayed in the retrieval page P11 is operated by the user terminal 3, the control unit 21 extracts one or a plurality of facilities from a plurality of facilities registered in advance, in accordance with the retrieval conditions. Meanwhile, in a case where only one of the area and the genre is set as the retrieval condition by the user terminal 3, the control unit 21 can extract a facility on the basis of the area or the genre.

Figure 5:
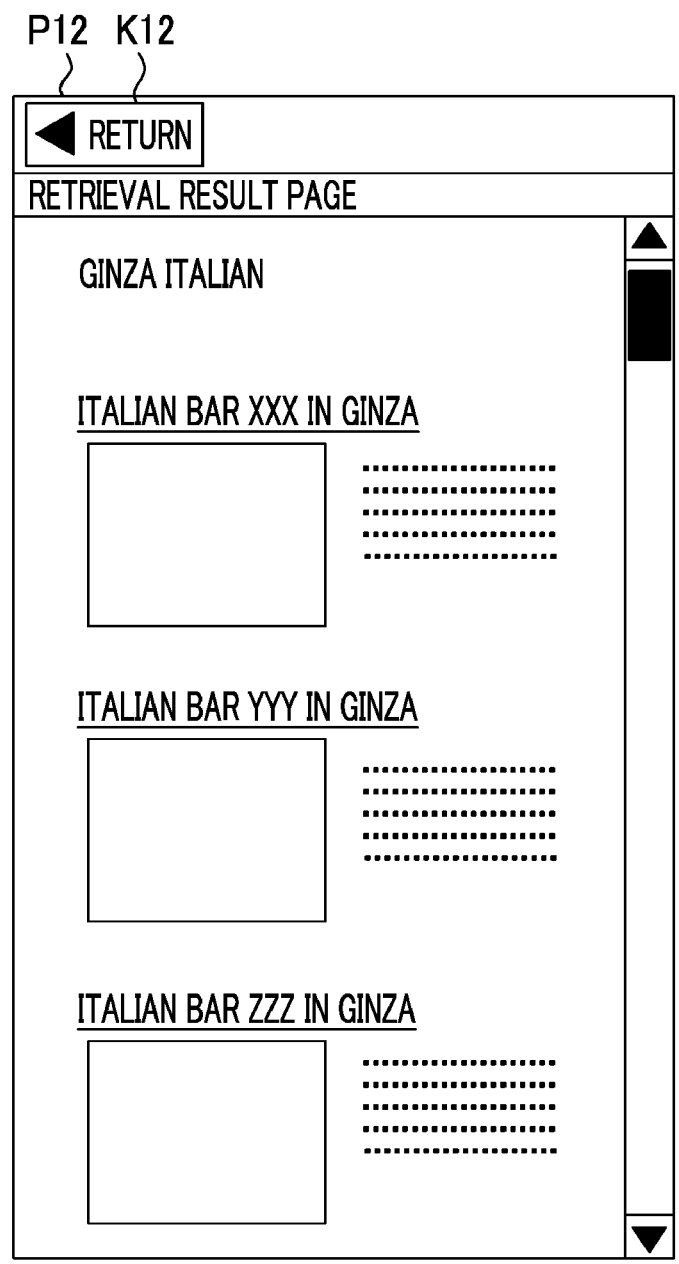
FIG. 5 is a diagram illustrating an example of a display screen which is displayed on the user terminal in the information providing system according to the embodiment of the invention.

Thereafter, the control unit 21 displays a retrieval result page P12 having information, such as the photo or explanation of the extracted facility, displayed thereon on the user terminal 3, as illustrated in FIG. 5. As illustrated in FIG. 5, in the retrieval result page P12, the contents of the retrieval conditions are displayed, and a list of pieces of information on the plurality of facilities is displayed.

In addition, as illustrated in FIGS. 4 and 5, in a case where the retrieval page P11 and the retrieval result page P12 are displayed, an operation key K12 receiving a browser back operation of returning a web page being currently viewed by one is displayed on the user terminal 3. In general, a web page displayed one page before the web page being currently viewed is displayed on the user terminal 3 in accordance with the operation of the operation key K12. On the other hand, in the information providing system 1, in a case where the operation key K12 is operated during the display of the retrieval result page P12 as described later, the control unit 21 displays a retrieval-related page P31 to be described later on the user terminal 3, instead of the web page displayed one page before the web page being currently viewed.

In addition, the control unit 21 determines that the retrieval result display request has been made also in a case where access from an external website to a Uniform Resource Locator (URL) corresponding a retrieval result page is made by the user terminal 3 (S1: Yes).

Meanwhile, in a case where one or a plurality of retrieval items are input as retrieval conditions to perform retrieval in the external website, contents of the retrieval items are included in the URL which is used during the access from the user terminal 3. Thereby, the control unit 21 can acquire the retrieval conditions in accordance with the access from the user terminal 3 to the URL. Here, FIGS. 6 and 7 are diagrams illustrating a retrieval operation which is performed within the external website.

Figure 6:
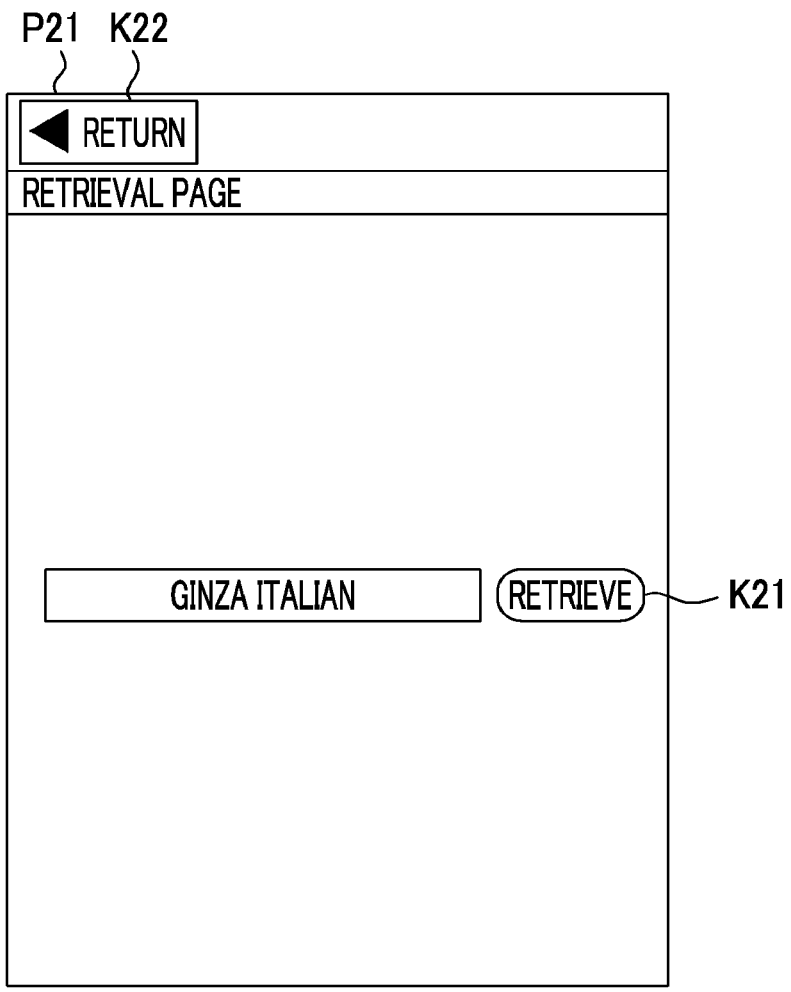
FIG. 6 is a diagram illustrating an example of a display screen which is displayed on the user terminal in the information providing system according to the embodiment of the invention.

As illustrated in FIG. 6, in the retrieval page P21 displayed in the external website, one or a plurality of any retrieval words can be set as retrieval conditions. When the retrieval word is input and a retrieval key K21 for starting retrieval is operated, information is retrieved on the basis of the retrieval word so that a retrieval result page P22 is displayed on the user terminal 3. In the retrieval result page P22, information extracted on the basis of the retrieval word is displayed in a region A21. Here, in the retrieval result page P22, link information including information on an URL for displaying retrieval results in a case where a facility is retrieved by the retrieval word is also displayed in the specific website, and the user terminal 3 accesses the URL corresponding to the link information in accordance with the operation of the link information.

Figure 7:
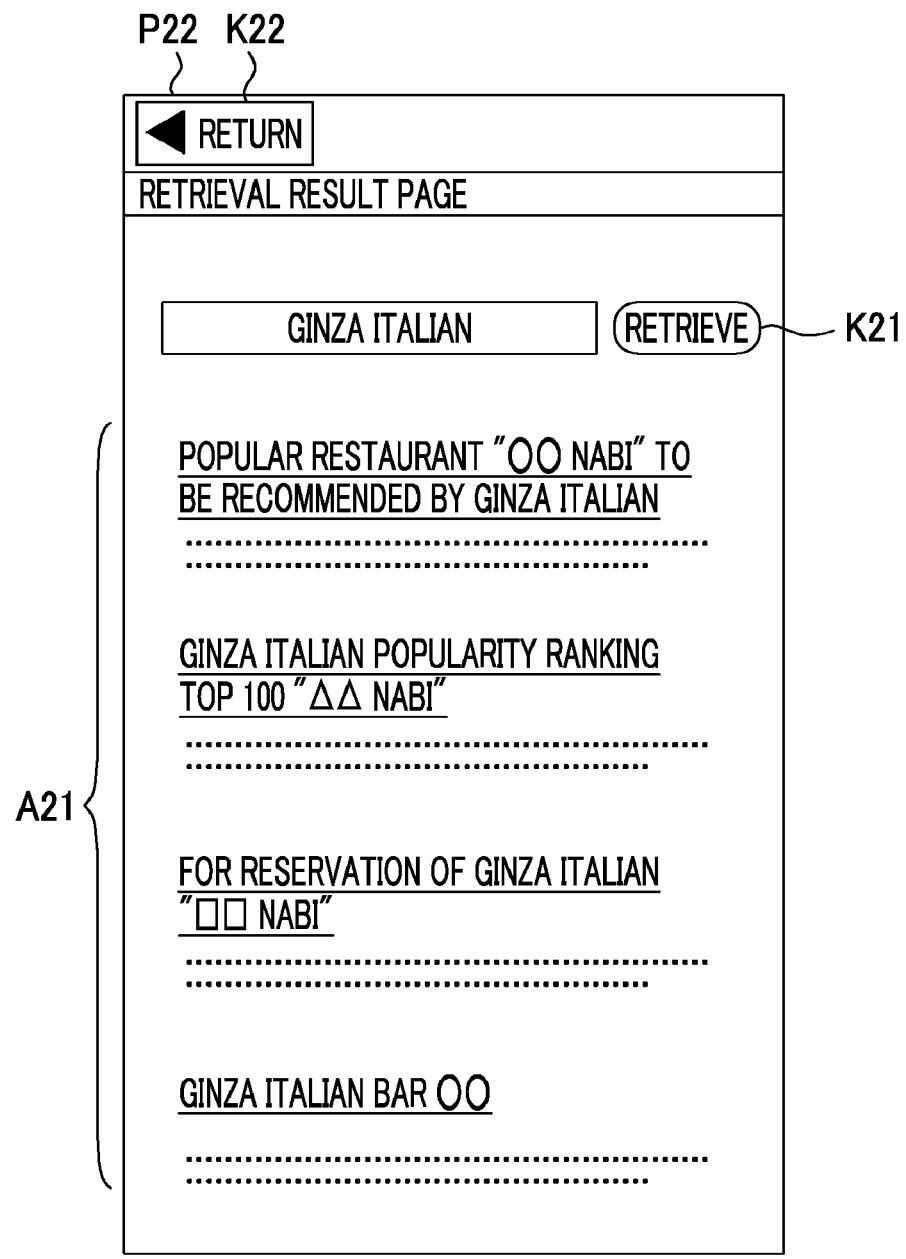
FIG. 7 is a diagram illustrating an example of a display screen which is displayed on the user terminal in the information providing system according to the embodiment of the invention.

Meanwhile, as illustrated in FIGS. 6 and 7, an operation key K22 receiving a browser back operation of returning a web page being currently viewed by one is also displayed on the facility page P21 and the retrieval result page P22. A web page displayed one page before the web page being currently viewed is displayed on the user terminal 3 in accordance with the operation of the operation key K22.

<Step S2>

In step S2, the control unit 21 determines whether or not the retrieval result display request has been made in the specific website. Meanwhile, such a determination process is executed by the determination processing unit 211 of the control unit 21.

Specifically, the control unit 21 determines that the retrieval result display request has been made within the specific website in a case where a domain of a website which is a transition source indicated by reference information is the same as the domain of the specific website, with reference to the reference information at the time of accessing the URL of a retrieval result page accompanied by the retrieval result display request. On the other hand, in a case where the domain of the website which is a transition source indicated by the reference information is different from the domain of the specific web site, it is determined that the retrieval result display request has been made in the external website.

The control unit 21 causes the process to proceed to step S21 in a case where the retrieval result display request has been made in the specific website (S2: Yes), and causes the process to proceed to step S3 in a case where the retrieval result display request has been made in the external website (S2: No). Meanwhile, it is considered that the control unit 21 determines that the retrieval result display request has been made in the specific website in a case where information on the website which is a transition source is not recorded in the reference information. In addition, the control unit 21 may determine that the retrieval result display request has been made in the external website in a case where information on the website which is a transition source is not recorded in the reference information.

<Step S21>

In step S21, the control unit 21 displays the retrieval result page P12 on the user terminal 3 in accordance with the retrieval result display request. Specifically, the control unit 21 displays retrieval results obtained by the extraction of the facility on the basis of the retrieval conditions input in the specific website or the retrieval conditions input in the external website, on the retrieval result page P12. In this manner, in a case where the display request has been made in the specific website (S2: Yes), a process of displaying the retrieval result page P11 is executed by the first display processing unit 212 of the control unit 21.

Here, FIG. 5 is a diagram illustrating an example of the retrieval result page P12. As illustrated in FIG. 5, in the retrieval result page P12, a list of pieces of information on one or a plurality of facilities extracted in accordance with the retrieval conditions is displayed. When information on any facility is selected in the retrieval result page P12, the control unit 21 displays the selected detailed information (not shown) on the facility on the user terminal 3. Meanwhile, the control unit 21 can also receive a reservation of a facility as the retrieval target or a procedure such as the purchase of an article as the retrieval target from the user terminal 3 in the specific website.

<Step S22>

In step S22, the control unit 21 determines whether or not a browser back operation through the user terminal 3 has been performed. Specifically, the control unit 21 determines whether or not the operation key K12 displayed on the retrieval result page P12 has been operated. The control unit 21 causes the process to proceed to step S3 when the browser back operation is performed (S22: Yes), and the control unit 21 causes the process to stand by in step S22 in a case where the browser back operation has not been performed (S22: No).

That is, in a case where the browser back operation has been performed in the related information page after the retrieval result page P12 is displayed, the control unit 21 displays a retrieval-related page P31 to be described later (see FIG. 8) on the user terminal 3, instead of displaying the external website. In this manner, the control unit 21 displays the retrieval-related page P31 not only in a case where the browser back operation has been performed in the retrieval result page P12 after the retrieval result page P12 is displayed through the retrieval-related page P31, but also in a case where the browser back operation has been performed in the retrieval result page P12 after the retrieval result page P12 is displayed without going through the retrieval-related page P31.

Thereby, the user is expected to access another related information and the like in the retrieval-related page P31, and leaving from the specific website including the related information page and the retrieval-related page P31 is suppressed. In addition, as another embodiment, it is also considered that the control unit 21 displays the retrieval-related page P31 on the basis of retrieval conditions retrieved in the retrieval page P11 immediately before in a case where the browser back operation has been performed in the retrieval page P11, instead of a case where the browser back operation has been performed in the retrieval result page P12.

Meanwhile, as another embodiment, it is also considered that the control unit 21 displays the retrieval-related page P31 in a case where the browser back operation has been performed in the retrieval result page P12 after the retrieval result page P12 is displayed through the retrieval-related page P31, and does not display the retrieval-related page P31 in a case where the browser back operation has been performed in the retrieval result page P12 after the retrieval result page P12 is displayed without going through the retrieval-related page P31.

<Step S3>

In a case where the retrieval result display request is made in the external web site, the control unit 21 acquires one or a plurality of suggestion keywords displayed as candidates of an additional retrieval word in a case where the retrieval conditions are input in the external website, in the subsequent step S3. Specifically, the control unit 21 accesses the external website to input contents of the retrieval items included in the retrieval conditions as a retrieval word, and acquires suggestion keywords displayed at that time. For example, in a case where suggestion keywords of "Ginza" and "Italian" are input as retrieval conditions, a suggestion keyword such as "women meeting" or "dating" may be displayed. Meanwhile, a method of specifying the suggestion keyword by the control unit 21 is not limited thereto. The control unit 21 requests the suggestion keyword from a server device that stores the external website, and the suggestion keyword may be acquired from the server device.

<Step S4>

In step S4, the control unit 21 displays the retrieval-related page P31 on which the first operation portion and the second operation portion are displayed. The first operation portion receives a request for displaying the retrieval result page P12, and the second operation portion receives a request for displaying a related information page on which related information extracted in association with one or a plurality of retrieval items is displayed. In this manner, a process of displaying the retrieval-related page P31 in a case where the display request has been made in an external website different from the specific website is executed by the second display processing unit 213 of the control unit 21. Specifically, in a case where an area and a genre are set as the retrieval conditions, the second operation portion receiving a request for displaying related information page, having related information related to either one or both of the area and the genre displayed thereon, is displayed on the retrieval-related page P31. That is, even when the URL of link information corresponding to the retrieval results displayed on the retrieval result page P22 is the URL of the retrieval result page P12, the retrieval-related page P31 is displayed in a case where the display request has been made from an external website.

In addition, it is also considered that the control unit 21 preferentially displays the second operation portion corresponding to related information related to the suggestion keyword, among the pieces of related information, at a higher rank in the retrieval-related page P31. Meanwhile, when the related information related to the suggestion keyword is displayed, the control unit 21 also displays contents of the suggestion keyword in association with the related information.

Here, an example of the display of the retrieval-related page P31 in step S4 of the information providing process will be described. Here, FIG. 8 is a diagram illustrating an example of the retrieval-related page P31. In FIG. 8, three display screens connected to each other by a dashed line indicate continuous display screens on the retrieval-related page P31 which are displayed by scroll display in the retrieval-related page P31. In the retrieval-related page P31, regions A30 to A35 are displayed from the upper portion toward the lower portion.

The region A30 is a region in which the retrieval conditions are displayed. Here, two retrieval items of "Ginza" indicating an area and "Italian" indicating a genre are displayed as retrieval conditions in the region A30. Thereby, the user can refer to retrieval results while confirming correctness or incorrectness of the retrieval conditions which are input by the user.

In the region A31, one or a plurality of regions receiving an operation for displaying one or a plurality of pieces of related information, which are extracted as information related to the area set as the retrieval condition or the present time, are displayed as the second operation portion. The control unit 21 receives an operation with respect to each region in the region A31 as an operation for the second operation portion, in accordance with an operation of the user of the user terminal 3. Meanwhile, the control unit 21 can determine the related information related to the time, on the basis of the time information D3. For example, in a case where the present time is July, "beer garden" is extracted as a theme, and a region corresponding to related information such as "beer garden special topic" related to "beer garden" is displayed in the region A31. Specifically, in a case where the region of "beer garden special topic" is operated, a facility associated with the theme of the beer garden is extracted from the facility information D2, and is displayed on the related information page.

In addition, it is also considered that the control unit 21 preferentially displays, in the region A31, a region corresponding to related information, such as the number of times of viewing or the number of reservations, which has high use frequency among the pieces of related information prepared in the specific web site. Further, the control unit 21 may preferentially display a region corresponding to related information related to a high-order keyword of the suggestion keyword, among the pieces of related information, at a higher rank. Meanwhile, at least information on the related information such as a theme corresponding to the related information shown in the region A31 may be displayed on the retrieval-related page P31. On the other hand, the control unit 21 may display the related information on the retrieval-related page P31. Specifically, it is considered that the control unit 21 displays a theme corresponding to the related information shown in the region A31 and information on a facility corresponding to the theme on the retrieval-related page P31. In this case, the control unit 21 may not display the second operation portion on the retrieval-related page P31. In addition, it is also considered that the control unit 21 displays the related information page instead of the retrieval-related page P31 in a case where the display request has been made in an external website different from the specific website.

In the region A32, one or a plurality of regions receiving an operation for displaying one or a plurality of pieces of related information, which are extracted as information related to the genre set as the retrieval condition, are displayed as the second operation portion. The control unit 21 receives an operation with respect to each region in the region A32 as an operation for the second operation portion, in accordance with an operation of the user of the user terminal 3.

In the region A33, one or a plurality of regions receiving an operation for displaying one or a plurality of pieces of related information, which are extracted as information related to the area set as the retrieval condition, are displayed as the second operation portion. Particularly, in the region A33, a region corresponding to related information on surrounding map information, sightseeing, or accommodation facilities, and the like of the area, which is set as the retrieval condition, is displayed. The control unit 21 receives an operation with respect to each region in the region A33 as an operation for the second operation portion, in accordance with an operation of the user of the user terminal 3. Meanwhile, the control unit 21 can determine the related information related to the area on the basis of the area information D4. For example, in a case where a spot of "○○ city" is associated with an area of "Ginza" and "Ginza" is set as the retrieval condition in the related information D4, the spot of "○○ city" is selected as related information.

In the region A34, one or a plurality of regions receiving an operation for displaying one or a plurality of pieces of related information, which are extracted as information related to the area set as the retrieval condition, are displayed as the second operation portion. Particularly, in the region A34, as the related information, one or a plurality of regions for displaying information on a facility belonging to a group associated with a theme, which is the same as or similar to the suggestion keyword acquired in step S3, are displayed as the second operation portion. The control unit 21 receives an operation with respect to each region in the region A34 as an operation for the second operation portion, in accordance with an operation of the user of the user terminal 3. Meanwhile, all of the pieces of related information displayed in the regions A31 to A34 may not be information related to the retrieval conditions.

The region A35 is a region in which an operation portion for displaying the retrieval result page P12, having retrieval results obtained under the retrieval conditions displayed thereon, is displayed, and is equivalent to the first operation portion. The control unit 21 can receive an operation with respect to the region A35 as an operation for the first operation portion, in accordance with an operation of the user of the user terminal 3.

Incidentally, in a case where keywords, such as "inexpensive" and "luxury", which are related to a price are included as the suggestion keyword, it is considered that the control unit 21 extracts facilities in which the budget in the facility information D2 matches conditions of the amount of money based on the suggestion keyword, with reference to the budget, and displays the extracted facilities in the regions A31 to A34 and the like as related information. For example, it is considered that the control unit 21 extracts facilities in which a budget is equal to or less than 3500 yen in a case where the suggestion keyword includes "inexpensive", and extracts facilities in which a budget is equal to or greater than 8000 yen in a case where the suggestion keyword includes "luxury". Further, it is considered that the control unit 21 stores an average budget in the user information D1 on the basis of the past reservation history and the like for each user. In this case, it is considered that the control unit 21 extracts facilities matching conditions of an average budget for each user and displays the extracted facilities in the regions A31 to A34 and the like as related information when the retrieval-related page P31 is displayed in a user's login state. In a case where the user is currently logging on the specific website or in a case where automatic login can be performed, the related information to be displayed on the retrieval-related page P31 may be selected on the basis of the user information D1 corresponding to the current user. For example, it is considered that the control unit 21 preferentially extracts related information related to a theme which was used by the user, like a use theme included in the user information D1. Similarly, an average use amount of money and the like for each user are stored in the user information D1, and it is considered that the control unit 21 extracts information on facilities, which are sorted by a budget equal to or less than an average use amount of money for each user, as related information and displays the extracted information on the retrieval-related page P31.

<Step S5>

In step S5, the control unit 21 determines whether or not a display request operation for the retrieval result page P12 has been performed in the retrieval-related page P31. Specifically, the control unit 21 determines that the display request operation for the retrieval result page P12 has been performed in a case where the region A35 which is the first operation portion has been operated in the retrieval-related page P31. In a case where the control unit 21 determines that the display request operation for the retrieval result page P12 has been performed (S5: Yes), the control unit 21 causes the process to proceed to step S21 and displays the retrieval result page P12 on the user terminal 3. In this manner, a process of displaying the retrieval result page P11 in a case where the display request has been made in the specific website is executed by the first display processing unit 211 of the control unit 21. Meanwhile, in a case where the control unit 21 determines that the display request operation for the retrieval result page P12 has not been performed (S5: No), the control unit causes the process to proceed to step S6.

<Step S6>

In step S6, the control unit 21 determines whether or not a display request operation for the related information page has been performed. Specifically, the control unit 21 determines that the display request operation for the related information page has been performed in a case where the second operation portion corresponding to any related information in any one of the regions A31 to A34 is operated in the retrieval-related page P31. The control unit 21 causes the process to proceed to step S61 in a case where the control unit determines that the display request operation for the related information page has been performed (S6: Yes), and causes the process to proceed to step S7 in a case where the control unit determines that the display request operation for the related information page has not been performed (S6: No).

<Step S61>

In step S61, the control unit 21 displays the related information page on the user terminal 3 in accordance with the retrieval result display request. In this manner, a process of displaying the related information page in a case where the second operation portion has been operated in the retrieval-related page P31 is executed by the third display processing unit 214 of the control unit 21. Meanwhile, in a case where information on any facility is selected in the related information page, the control unit 21 displays detailed information on the selected facility on the user terminal 3. Meanwhile, the control unit 21 can also receive a reservation of the facility displayed on the related information page or a procedure such as the purchase of an article from the user terminal 3.

<Step S62>

In step S62, the control unit 21 determines whether or not a browser back operation (an operation of a return key) through the user terminal 3 has been performed. When the browser back operation has been performed (S62: Yes), the control unit 21 causes the process to proceed to step S3 to display the retrieval-related page P31 on the user terminal 3.

In a case where the browser back operation has not been performed (S62: No), the control unit 21 causes the process to stand by in step S62.

That is, in a case where the browser back operation has been performed in the related information page after the related information page is displayed, the control unit 21 displays the retrieval-related page P31 on the user terminal 3, instead of displaying the external website. Thereby, the user is expected to access another related information and the like in the retrieval-related page P31, and leaving from a specific website including the related information page and the retrieval-related page P31 is suppressed.

<Step S7>

In step S7, the control unit 21 determines whether or not the browser back operation through the user terminal 3 has been performed in the retrieval-related page P31. Specifically, the control unit 21 determines whether or not an operation key K31 displayed on the retrieval-related page P31 has been operated. When the browser back operation has been performed (S7: Yes), the control unit 21 terminates the information providing process. In this case, the control unit 21 accesses the external website again before accessing the retrieval-related page P31 to display a web page displayed one page before the retrieval-related page P31. In a case where the browser back operation has not been performed (S7: No), the control unit 21 causes the process to proceed to step S5.

As described above, in the information providing system 1, the information providing device 2 changes displayed contents in accordance with whether or not access to the retrieval result page P12 has been performed within a specific website, at the time of displaying the retrieval result page P12 in the specific website in accordance with the operation of the user terminal 3.

More specifically, in a case where the access to the retrieval result page P12 has been performed within the specific website, the control unit 21 displays the retrieval result page P12 on the user terminal 3. On the other hand, in a case where the access to the retrieval result page P12 has been performed in an external website different from the specific website, the control unit 21 displays the retrieval-related page P31 before displaying the retrieval result page P12.

Thereby, various pieces of information included in the specific website are provided to the user. Thus, the possibility of provision of information useful to the user is increased, and it is possible to suppress the rate of leaving from the specific website.

[Appendixes of the Invention]

Hereinafter, an outline of the invention which is extracted from the above-described embodiment will be appended. Meanwhile, configurations and processing functions to be described in the following appendixes can be selected and arbitrarily combined with each other.

<Appendix 1>

An information providing method including:

determining whether a request for displaying a retrieval result page has been made in a specific website including the retrieval result page, in a case where the display request has been made, the retrieval result page being a page on which a retrieval target extracted under retrieval conditions including one or a plurality of retrieval items, among a plurality of retrieval targets registered in advance, is displayed; and changing displayed contents in accordance with whether or not the display request has been made in the specific website.

<Appendix 2>

The information providing method according to appendix 1, wherein the retrieval result page is displayed in a case where the display request has been made in the specific website, and wherein in a case where the display request has been made in an external website different from the specific website, a retrieval-related page, having at least information on pieces of related information extracted in relation to the one or plurality of retrieval items displayed thereon, is displayed instead of the retrieval result page.

<Appendix 3>

The information providing method according to appendix 2, wherein a first operation portion and a second operation portion are displayed on the retrieval-related page, the first operation portion being a portion receiving the request for displaying the retrieval result page and the second operation portion being a portion receiving a request for displaying a related information page on which the pieces of related information extracted in relation to the one or plurality of retrieval items is displayed, and wherein the retrieval result page is displayed in a case where the first operation portion is operated, and the related information page is displayed in a case where the second operation portion is operated.

<Appendix 4>

The information providing method according to any one of appendixes 1 to 3, wherein it is determined whether or not the display request has been made in the specific website, on the basis of reference information when the request for displaying the retrieval result page has been made.

<Appendix 5>

The information providing method according to any one of appendixes 1 to 4, wherein in a case where the display request has been made in the external website, one or a plurality of suggestion keywords to be displayed as candidates of additional retrieval words are acquired in a case where the retrieval conditions are input in the external website, and wherein the second operation portion corresponding to related information related to the suggestion keywords, among the pieces of related information, is preferentially displayed at a higher rank in the retrieval-related page.

<Appendix 6>

The information providing method according to any one of appendixes 1 to 5, wherein a retrieval item corresponding to at least an area and a genre is included in the retrieval conditions, wherein information on a store corresponding to the area and the genre is displayed on the retrieval result page, and wherein related information related to at least one of the area and the genre is displayed on the related information page.

<Appendix 7>

The information providing method according to any one of appendixes 1 to 6, wherein the retrieval-related page is displayed in a case where a browser back operation has been performed in the retrieval result page after the retrieval result page is displayed through the retrieval-related page.

<Appendix 8>

The information providing method according to any one of appendixes 1 to 7, wherein the retrieval-related page is displayed in a case where the browser back operation has been performed in the retrieval result page after the retrieval result page is displayed without going through the retrieval-related page.

<Appendix 9>

An information providing program for causing a processor to execute:

a step of determining whether a request for displaying a retrieval result page has been made in a specific website including the retrieval result page, in a case where the display request has been made, the retrieval result page being a page on which a retrieval target extracted under retrieval conditions including one or a plurality of retrieval items, among a plurality of retrieval targets registered in advance, is displayed; and a step of changing displayed contents in accordance with whether or not the display request has been made in the specific website.

<Appendix 10>

An information providing device including:

a determination processing unit that determines whether a request for displaying a retrieval result page has been made in a specific website including the retrieval result page, in a case where the display request has been made, the retrieval result page being a page on which a retrieval target extracted under retrieval conditions including one or a plurality of retrieval items, among a plurality of retrieval targets registered in advance, is displayed; and a display processing unit that changes displayed contents in accordance with whether or not the display request has been made in the specific website.

<Appendix 11>

An information providing method including:

determining whether a request for displaying a retrieval result page has been made in a specific website including the retrieval result page, in a case where the display request has been made, the retrieval result page being a page on which a retrieval target extracted under retrieval conditions including one or a plurality of retrieval items, among a plurality of retrieval targets registered in advance, is displayed;

displaying the retrieval result page in a case where the display request has been made in the specific website;

displaying a retrieval-related page on which a first operation portion and a second operation portion are displayed, in a case where the display request has been made in an external website different from the specific website, instead of displaying the retrieval result page, the first operation portion being a portion receiving the request for displaying the retrieval result page and the second operation portion being a portion receiving a request for displaying a related information page on which the pieces of related information extracted in relation to the one or plurality of retrieval items is displayed; and displaying the retrieval result page in a case where the first operation portion is operated, and displaying the related information page in a case where the second operation portion is operated.

<Appendix 12>

An information providing program for causing a processor to execute:

a step of determining whether a request for displaying a retrieval result page has been made in a specific website including the retrieval result page, in a case where the display request has been made, the retrieval result page being a page on which a retrieval target extracted under retrieval conditions including one or a plurality of retrieval items, among a plurality of retrieval targets registered in advance, is displayed;

a step of displaying the retrieval result page in a case where the display request has been made in the specific website;

a step of displaying a retrieval-related page on which a first operation portion and a second operation portion are displayed, in a case where the display request has been made in an external website different from the specific website, instead of displaying the retrieval result page, the first operation portion being a portion receiving the request for displaying the retrieval result page and the second operation portion being a portion receiving a request for displaying a related information page on which the pieces of related information extracted in relation to the one or plurality of retrieval items is displayed; and a step of displaying the retrieval result page in a case where the first operation portion is operated, and displaying the related information page in a case where the second operation portion is operated.

<Appendix 13>

An information providing device including:

a determination processing unit that determines whether a request for displaying a retrieval result page has been made in a specific website including the retrieval result page, in a case where the display request has been made, the retrieval result page being a page on which a retrieval target extracted under retrieval conditions including one or a plurality of retrieval items, among a plurality of retrieval targets registered in advance, is displayed;

a first display processing unit that displays the retrieval result page in a case where the display request has been made in the specific website;

a second display processing unit that displays a retrieval-related page on which a first operation portion and a second operation portion are displayed, in a case where the display request has been made in an external website different from the specific website, instead of displaying the retrieval result page, the first operation portion being a portion receiving the request for displaying the retrieval result page and the second operation portion being a portion receiving a request for displaying a related information page on which the pieces of related information extracted in relation to the one or plurality of retrieval items is displayed; and a third display processing unit that displays the retrieval result page in a case where the first operation portion is operated, and displays the related information page in a case where the second operation portion is operated.

The invention claimed is:

1. An information providing method comprising:
receiving a display request for displaying a retrieval result page;
determining that the display request for displaying the retrieval result page has been made in a specific website including the retrieval result page when a domain of a website which is a transition source to the specific website at a time of the display request is the same as a domain of the specific website;
determining that the display request for displaying the retrieval result page has not been made in the specific website including the retrieval result page when the domain of the website which is the transition source at the time of the display request is not the same as the domain of the specific website;
changing displayed contents in a first manner when the display request for displaying the retrieval result page has been made in the specific website; and
changing the displayed contents in a second manner different from the first manner when the display request for displaying the retrieval result page has not been made in the specific website, wherein the retrieval result page is a page on which a retrieval target extracted under retrieval conditions including one or a plurality of retrieval items, among a plurality of retrieval targets registered in advance, is displayed, wherein the changing the displayed contents in the first manner includes displaying the retrieval result page, wherein the changing the displayed contents in the second manner includes displaying a retrieval-related page, having at least information on pieces of related information extracted in relation to the one or plurality of retrieval items displayed thereon, instead of the retrieval result page, and wherein the retrieval-related page, that is displayed instead of the requested for retrieval result page, is a page within the domain of the specific website even though the domain of the website which is the transition source at the time of the display request is external to the domain of the specific website.

2. The information providing method according to claim 1, wherein the determining that the display request for displaying the retrieval result page has not been made in the specific website includes determining that the display request has been made in an external website different from the specific website, and wherein the external website, in which the display request for the requested for retrieval result page has been made, is external to the domain of the specific website.

3. The information providing method according to claim 2, further comprising:

displaying a first operation portion and a second operation portion on the retrieval-related page, the first operation portion being a portion for receiving the display request for displaying the retrieval result page and the second operation portion being a portion for receiving a request for displaying a related information page on which the pieces of related information extracted in relation to the one or plurality of retrieval items is displayed, displaying the retrieval result page when the first operation portion is operated, and displaying the related information page when the second operation portion is operated.

4. The information providing method according to claim 1, wherein the determining that the display request for displaying the retrieval result page has been made in the specific website including the retrieval result page and the determining that the display request for displaying the retrieval result page has not been made in the specific website are made on the basis of reference information.

5. The information providing method according to claim 3, further comprising:

acquiring one or a plurality of suggestion keywords to be displayed as candidates of additional retrieval words are acquired when the retrieval conditions are input in the external website, and displaying the second operation portion corresponding to related information related to the suggestion keywords, among the pieces of related information, at a higher rank in the retrieval-related page.

6. The information providing method according to claim 3, wherein a retrieval item corresponding to at least an area and a genre is included in the retrieval conditions, wherein information on a store corresponding to the area and the genre is displayed on the retrieval result page, and wherein related information related to at least one of the area and the genre is displayed on the related information page.

7. The information providing method according to claim 2, further comprising displaying the retrieval-related page when a browser back operation has been performed in the retrieval result page after the retrieval result page is displayed through the retrieval-related page.

8. The information providing method according to claim 7, further comprising displaying the retrieval-related page when the browser back operation has been performed in the retrieval result page after the retrieval result page is displayed without going through the retrieval-related page.

9. The information providing method according to claim 4, wherein the display request for displaying the retrieval result page has been made in the specific website including the retrieval result page when the transition source is not recorded in the reference information.

10. A non-transitory storage medium storing an information providing program for causing a processor to execute:

receiving a display request for displaying a retrieval result page;

determining that the display request for displaying the retrieval result page has been made in a specific website including the retrieval result page when a domain of a website which is a transition source to the specific website at a time of the display request is the same as a domain of the specific website;

determining that the display request for displaying the retrieval result page has not been made in the specific website including the retrieval result page when the domain of the website which is the transition source at the time of the display request is not the same as the domain of the specific website;

changing displayed contents in a first manner when the display request for displaying the retrieval result page has been made in the specific website; and changing the displayed contents in a second manner different from the first manner when the display request for displaying the retrieval result page has not been made in the specific website, wherein the retrieval result page is a page on which a retrieval target extracted under retrieval conditions including one or a plurality of retrieval items, among a plurality of retrieval targets registered in advance, is displayed, wherein the changing the displayed contents in the first manner includes displaying the retrieval result page, wherein the changing the displayed contents in the second manner includes displaying a retrieval-related page, having at least information on pieces of related information extracted in relation to the one or plurality of retrieval items displayed thereon, instead of the retrieval result page, and wherein the retrieval-related page, that is displayed instead of the requested for retrieval result page, is a page within the domain of the specific website even though the domain of the website which is the transition source at the time of the display request is external to the domain of the specific website.

11. An information providing device comprising:
at least one hardware processor configured to:
receive a display request for displaying a retrieval result page;
determine that the display request for displaying the retrieval result page has been made in a specific website including the retrieval result page when a domain of a website which is a transition source to the specific website at a time of the display request is the same as a domain of the specific website;
determine that the display request for displaying the retrieval result page has not been made in the specific website including the retrieval result page when the domain of the website which is the transition source at the time of the display request is not the same as the domain of the specific website;
change displayed contents in a first manner when the display request for displaying the retrieval result page has been made in the specific website; and
change the displayed contents in a second manner different from the first manner when the display request for displaying the retrieval result page has not been made in the specific web site,
wherein the retrieval result page is a page on which a retrieval target extracted under retrieval conditions including one or a plurality of retrieval items, among a plurality of retrieval targets registered in advance, is displayed,
wherein the change the displayed contents in the first manner includes displaying the retrieval result page,
wherein the change the displayed contents in the second manner includes displaying a retrieval-related page, having at least information on pieces of related information extracted in relation to the one or plurality of retrieval items displayed thereon, instead of the retrieval result page, and
wherein the retrieval-related page, that is displayed instead of the requested for retrieval result page, is a page within the domain of the specific website even though the domain of the website which is the transition source at the time of the display request is external to the domain of the specific website.

12. An information providing method comprising:
receiving a display request for displaying a retrieval result page;
determining whether the display request is made on a specific website including the retrieval result page or is made in an external website different from the specific website;
displaying the retrieval result page in response to the display request for displaying the retrieval result page when the display request is made on the specific website including the retrieval result page, the retrieval result page being a page on which a retrieval target extracted under retrieval conditions including one or a plurality of retrieval items, among a plurality of retrieval targets registered in advance, is displayed; and
displaying a retrieval-related page instead of the retrieval result page in response to the display request for displaying the retrieval result page when the display request has been made in the external website different from the specific website, the retrieval-related page having at least information on pieces of related information extracted in relation to the one or plurality of retrieval items displayed thereon, wherein
the retrieval-related page, that is displayed instead of the requested for retrieval result page, is a page within a domain of the specific website, and
the external website, in which the display request for the requested for retrieval result page has been made, is external to the domain of the specific website.

13. The information providing method according to claim 12, wherein the external website is a retrieval engine.

14. The information providing method according to claim 12, wherein the specific website has been registered in advance as a retrieval target.

15. The information providing method according to claim 12, further comprising:
after displaying the retrieval-related page instead of the retrieval result page, determining whether or not a display request operation for displaying the retrieval result page has been performed in the retrieval-related page; and
when it has been determined that the request operation for displaying the retrieval result page has been performed in the retrieval-related page, displaying the displaying the retrieval result page.

16. The information providing method according to claim 12, wherein
the display request for displaying the retrieval result page includes input of the one or a plurality of retrieval items,
the method further includes acquiring, from the external website, an additional retrieval item suggested by the external website, and
the retrieval-related page, that is the page within the domain of the specific website, includes information extracted based upon the additional retrieval item suggested by the external website.

17. The information providing method according to claim 16, wherein the additional retrieval item suggested by the external website is different from the one or a plurality of retrieval items.

18. The information providing method according to claim 12, wherein in a case where the display request for displaying the retrieval result page is made in the external website, the retrieval-related page is displayed before the retrieval result page is displayed.

19. A non-transitory storage medium for storing an information providing program for causing a processor to execute:
receiving a display request for displaying a retrieval result page;
determining whether the display request is made on a specific website including the retrieval result page or is made in an external website different from the specific website;
displaying the retrieval result page in response to the display request for displaying the retrieval result page when the display request is made on the specific website including the retrieval result page, the retrieval result page being a page on which a retrieval target extracted under retrieval conditions including one or a plurality of retrieval items, among a plurality of retrieval targets registered in advance, is displayed; and
displaying a retrieval-related page instead of the retrieval result page in response to the display request for displaying the retrieval result page when the display request has been made in the external website different from the specific website, the retrieval-related page having at least information on pieces of related information extracted in relation to the one or plurality of retrieval items displayed thereon, wherein the retrieval-related page, that is displayed instead of the requested for retrieval result page, is a page within a domain of the specific website, and the external website, in which the display request for the requested for retrieval result page has been made, is external to the domain of the specific website.

20. An information providing device comprising:

at least one hardware processor configured to:

receive a display request for displaying a retrieval result page;

determine whether the display request is made on a specific website including the retrieval result page or is made in an external website different from the specific website;

display the retrieval result page in response to the display request for displaying the retrieval result page when the display request is made on the specific website including the retrieval result page, the retrieval result page being a page on which a retrieval target extracted under retrieval conditions including one or a plurality of retrieval items, among a plurality of retrieval targets registered in advance, is displayed; and display a retrieval-related page instead of the retrieval result page in response to the display request for displaying the retrieval result page when the display request has been made in the external website different from the specific website, the retrieval-related page having at least information on pieces of related information extracted in relation to the one or plurality of retrieval items displayed, wherein the retrieval-related page, that is displayed instead of the requested for retrieval result page, is a page within a domain of the specific website, and the external website, in which the display request for the requested for retrieval result page has been made, is external to the domain of the specific website.

\* \* \* \* \*